Figure 1:
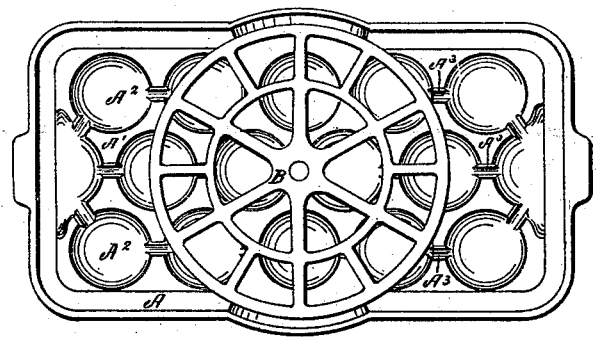

A. REID.

Dripping Pan.

No. 106,506.

Patented Aug 16, 1870.

Witnesses:
H. W. Dopp.
Michael J. Stark.

Inventor:
Adam Reid.

United States Patent Office.

ADAM REID, OF BUFFALO, NEW YORK.

Letters Patent No. 106,506, dated August 16, 1870.

DRIPPING-PAN.

The Schedule referred to in these Letters Patent and making part of the same.

I, ADAM REID, of Buffalo, in the county of Erie and State of New York, have invented certain Improvements in "Dripping-Pans," of which the following is a specification.

The nature of my invention consists in—

First, combining a revolving perforated platform for roasting meat, &c., with a dripping-pan.

Secondly, arranging and constructing the dripping-pan so that it may answer as well as waffle-pan or baking-tin for baking bread, cake, biscuits, &c.

I refer to the drawing which makes part of this specification, and in which—

Figure 1 is a top view, and

Figure 2:
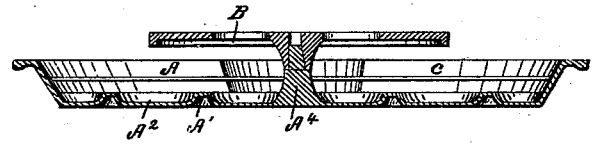

Figure 2, a longitudinal section of my improved pan.

Letter A in the drawing represents a dripping-pan constructed in a peculiar way, having a recessed bottom, $A^1$, for the reception of the fat or gravy, when meat or fowls are roasted in the pan, said recesses $A^2$ being connected with each other by means of channels or grooves $A^3$.

Projecting from this bottom $A^1$, in or about its center, is a pivot, $A^4$, upon and around which a perforated platform or grate, B, is revolving. This platform has for its purpose to receive the meat, fowl, &c., to be roasted.

Inside the pan, and upon its bottom, is placed a cover, C, which will answer as baking-tin, &c.

It may be observed that a pan constructed as aforesaid will serve many purposes—in fact, it is a substitute for most every culinary vessel.

First, may this pan, when the cover C and platform or grate B are removed, be used as frying-pan for eggs, &c., or as a waffle-pan, or as meat-roaster, and has the pan, for this latter purpose, especially the advantage over an ordinary frying-pan, that the meat to be roasted does not swim nor lie in the gravy, nor rest all upon the bottom of the frying-pan, which requires great attention to prevent the meat from burning, but that the meat only rests upon the projection of the recesses $A^2$, and, not lying in the gravy, is thus actually prevented from burning, and is better and more juicy when done than when roasted in an ordinary pan.

Second, will this pan constitute a baking-tin in every particular, and may, when the cover C is placed in the pan, be used for baking bread, cake, biscuit, &c., having, however, the advantage that bread will be baked better and more even upon this pan than any other, on account of the tin not being in direct contact with the plate of the oven, which burns the bread on its lower sides and leaves it undone on the upper side; but, being elevated from the stove-plates, and hot air constantly passing under the cover C, thus giving the tin an even temperature from all sides.

Third, it will be observed that, when the revolving grate is put on, this pan is admirably adapted to roasting beef, veal, or fowl, the same being placed upon the grate, which will enable the cook to turn and handle the meat with such ease, and so roast the same so even, that there can be no doubt but this pan is not only a decided improvement, and supplies a long-felt want, but will also soon become the favorite of all performing culinary duties.

Having thus fully described my invention,

I desire to secure by Letters Patent—

1. The combination of a dripping-pan, A, with the horizontal revolving perforated platform or grate B, for the purposes set forth.

2. Providing a dripping-pan, A, with recessed bottoms $A^1$ and $A^2$, connected, by grooves $A^3$, with pivot $A^4$ and revolving grate B, all constructed and arranged as described, and for the uses and purposes set forth.

ADAM REID.

Witnesses:
H. WM. DOPP,
MICHAEL J. STARK.